US009606709B2

(12) United States Patent
Kommann et al.

(10) Patent No.: US 9,606,709 B2
(45) Date of Patent: Mar. 28, 2017

(54) SYSTEM AND METHOD FOR GEOGRAPHIC DATA LAYER MANAGEMENT IN A GEOGRAPHIC INFORMATION SYSTEM

(71) Applicant: Google Inc., Mountain View, CA (US)

(72) Inventors: David Kommann, Tucson, AZ (US); Julien Charles Mercay, Belmont, CA (US)

(73) Assignee: Google Inc., Mountain View, CA (US)

( * ) Notice: Subject to any disclaimer, the term of this patent is extended or adjusted under 35 U.S.C. 154(b) by 910 days.

(21) Appl. No.: 13/727,706

(22) Filed: Dec. 27, 2012

(65) Prior Publication Data

US 2015/0177968 A1    Jun. 25, 2015

(51) Int. Cl.
G06F 3/0484    (2013.01)

(52) U.S. Cl.
CPC ................ G06F 3/04847 (2013.01)

(58) Field of Classification Search
None
See application file for complete search history.

(56) References Cited

U.S. PATENT DOCUMENTS

| | | | |
|---|---|---|---|
| 5,699,244 A | 12/1997 | Clark, Jr. et al. | |
| 7,142,205 B2 | 11/2006 | Chithambaram et al. | |
| 7,439,969 B2 | 10/2008 | Chithambaram et al. | |
| 7,583,273 B2 * | 9/2009 | Florence | G06F 3/04817 345/619 |
| 7,746,343 B1 * | 6/2010 | Charaniya | G06F 3/04815 345/428 |
| 7,752,555 B2 | 7/2010 | Sutanto et al. | |
| 7,793,232 B2 * | 9/2010 | Chaudhri | G06F 3/0481 709/217 |
| 7,949,548 B2 | 5/2011 | Mathai et al. | |
| 8,041,506 B2 | 10/2011 | Bliss et al. | |
| 8,667,419 B2 * | 3/2014 | Gorczowski | G06F 3/0482 715/817 |
| 8,948,788 B2 * | 2/2015 | Conway | G06F 1/1624 345/685 |

(Continued)

OTHER PUBLICATIONS

"Action Bar", Google Earth Help (support.google.com/earth/bin/answer)—2 pages.

(Continued)

*Primary Examiner* — Maryam Ipakchi
(74) *Attorney, Agent, or Firm* — Dority & Manning, P.A.

(57) ABSTRACT

A layer control tool for controlling the display of geographic data layers in a geographic information system is provided. The layer control tool can be presented in overlaying the geographic imagery. The layer control tool can include a plurality of identifiers associated with a set of geographic data layers that can be displayed in conjunction with the geographic imagery. A user can adjust or control the display of geographic data layers in conjunction with the geographic imagery by interacting with the floating layer control tool. For instance, a user can interact with the floating layer control tool, for instance by tapping a touch screen, to identify a selected geographic data layer in the set of geographic data layers. Responsive to this user interaction, the geographic information system can display the geographic data layer in conjunction with the geographic imagery and hide other previous displayed geographic data layers.

9 Claims, 11 Drawing Sheets

(56) References Cited

U.S. PATENT DOCUMENTS

| | | | |
|---|---|---|---|
| 8,954,386 B2 * | 2/2015 | Edmiston | G06F 17/3028 707/625 |
| 2004/0217947 A1 * | 11/2004 | Fitzmaurice | G06F 3/0481 345/183 |
| 2007/0118520 A1 | 5/2007 | Bliss et al. | |
| 2007/0157247 A1 * | 7/2007 | Cordray | G06F 3/0481 725/47 |
| 2008/0281839 A1 * | 11/2008 | Bevan | G06F 17/30241 |
| 2009/0183083 A1 * | 7/2009 | Hedges | G06F 3/04817 715/738 |
| 2009/0325607 A1 * | 12/2009 | Conway | G06F 1/1624 455/456.3 |
| 2010/0045667 A1 | 2/2010 | Kornmann et al. | |
| 2010/0064258 A1 * | 3/2010 | Gorczowski | G06F 3/0482 715/841 |
| 2011/0145286 A1 * | 6/2011 | LaRowe | G06F 17/30979 707/780 |
| 2015/0046491 A1 * | 2/2015 | Clark | G06F 17/30545 707/770 |

OTHER PUBLICATIONS

"Google Earth User Guide for the iPad", Google Earth Help (support.google.com/earth/bin/answer)—5 pages.

* cited by examiner

SYSTEM AND METHOD FOR GEOGRAPHIC DATA LAYER MANAGEMENT IN A GEOGRAPHIC INFORMATION SYSTEM

FIELD

The present disclosure relates generally to geographic information systems and more particularly to a control interface for managing the presentation of geographic data layers in a geographic information system.

BACKGROUND

Geographic information systems provide for the archiving, retrieving, and manipulating of data that has been stored and indexed according to geographic coordinates of its elements. Interactive geographic information systems allow for the navigating and displaying of geographic imagery. Some interactive geographic information systems provide a user interface with navigation controls for navigating cities, neighborhoods, geographic areas and other terrain in two or three dimensions. Geographic information systems can display many different layers of information on top of a two or three dimensional representation of the world. These geographic data layers can include, for instance, terrain data layers, street information data layers, building data layers, border data layers, and other geographic data layers that provide information associated with discrete geographic coordinates.

A user of a geographic information system often needs to compare two or more geographic data layers to find differences, such as changes in vegetation, construction, river path, etc. While geographic information systems currently include control capability for managing geographic data layers, the control capability can be cumbersome and can make it difficult for the user to focus on the information presented in the geographic data layers. For instance, a user may have to execute several actions and even navigate away from the screen displaying the geographic imagery to manage the presentation of geographic data layers. This is particularly true in mobile device applications where display space may be limited.

SUMMARY

Aspects and advantages of the invention will be set forth in part in the following description, or may be obvious from the description, or may be learned through practice of the invention.

One exemplary aspect of the present disclosure is directed to a computer-implemented method of providing geographic data layer control in a geographic information system. The method includes presenting a user interface on a display of a computing device. The user interface displays at least a portion of geographic imagery and a plurality of geographic data layers in conjunction with the geographic imagery. The method further includes presenting a floating layer control tool overlaying the geographic imagery. The floating layer control tool provides a control interface for a set of geographic data layers. The method further includes receiving a user interaction directed to the floating layer control tool selecting a geographic data layer in the set of geographic data layers. In response to the user interaction, the method performs operations that include displaying the selected geographic data layer in conjunction with the geographic imagery and hiding one or more of the plurality of geographic data layers.

Other exemplary aspects of the present disclosure are directed to systems, apparatus, non-transitory computer-readable media, user interfaces and devices for managing geographic data layers in a geographic information system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
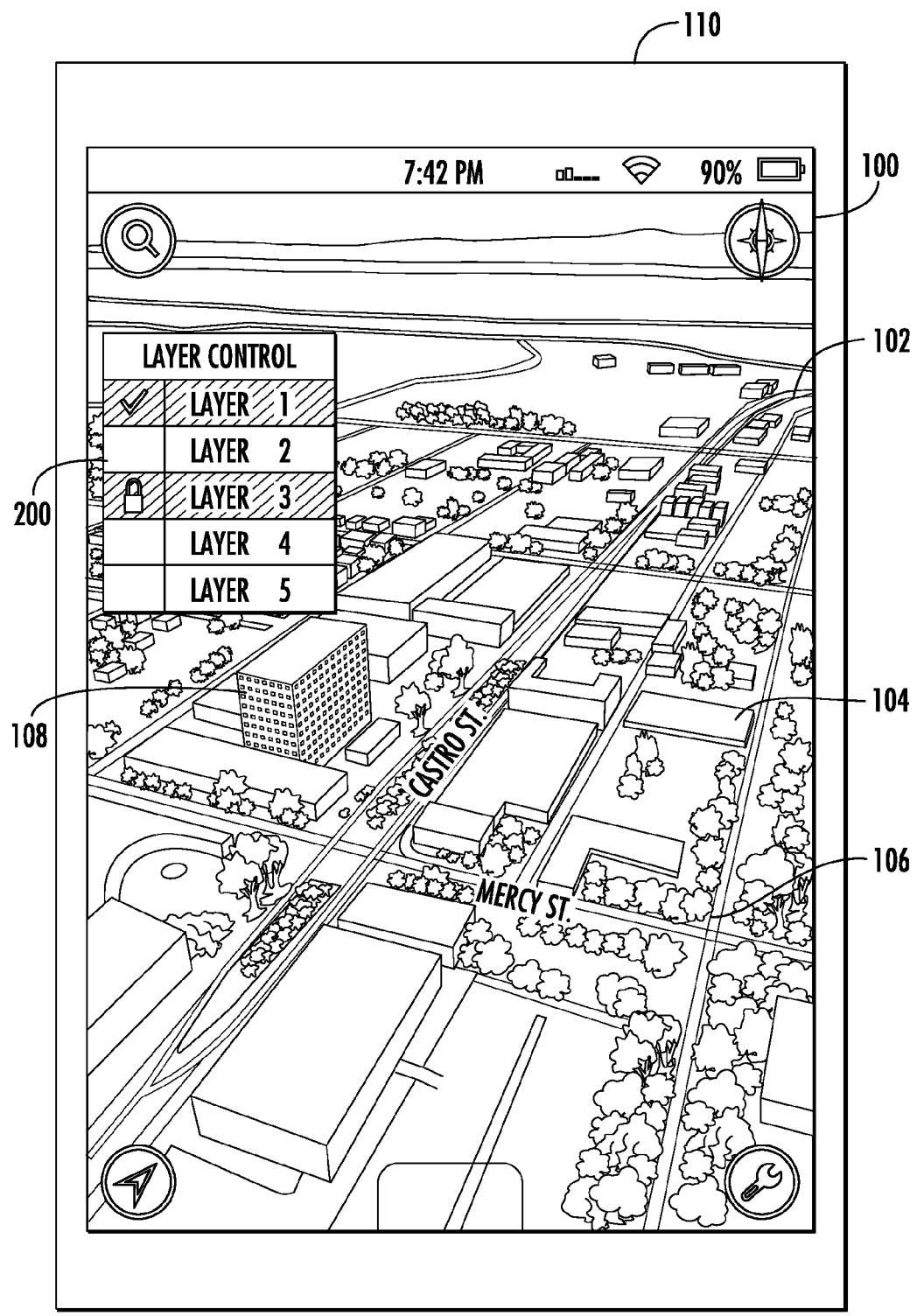
FIG. 1 depicts an exemplary user interface for a geographic information system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to a layer control tool for controlling the display of geographic data layers in a geographic information system. The geographic information system can be configured to present geographic imagery, such as map imagery, satellite imagery, three-dimensional geographic imagery, and other imagery associated with a geographic area. A floating layer control tool can be presented in conjunction with the geographic imagery. The floating layer control tool can include a plurality of layer identifiers associated with a set of geographic data layers that can be displayed in conjunction with the geographic imagery. The set of geographic data layers can include geographic data layers such as street information layers, building layers, vegetation layers, geolocated photo layers, traffic layers, survey data layers, transportation layers, border and label layers, business information layers, or other suitable geographic data layers providing information associated with discrete geographic coordinates. The floating layer control tool can be presented overlaying the geographic imagery so that it is readily accessible by a user.

A user can adjust or control the display of geographic data layers in conjunction with the geographic imagery by interacting with the floating layer control tool. For instance, a user can interact with the floating layer control tool, for instance by tapping a touch screen, to identify a selected geographic data layer in the set of geographic data layers. Responsive to this user interaction and without any further user interaction, the geographic information system can display the geographic data layer in conjunction with the geographic imagery and can hide other geographic data layers. As used herein, hiding a geographic data layer is intended to refer to removing a previously displayed geographic data layer from view. In this way, a user can easily switch between the display of various geographic data layers in conjunction with the geographic imagery using a single user interaction, such as tap on a touch screen of a mobile device.

Various other user interactions can be provided with the layer control tool to quickly adjust the display of data layers in conjunction with the geographic imagery. For instance, a user can interact with the layer control tool to lock or freeze a state of geographic data layers in the layer control tool. In one example, a user can provide a long tap or double tap with the layer control tool to lock a geographic data layer. A locked geographic data layer will not change state, for instance from a displayed state to a hidden state, upon further user interaction with the layer control tool. As another example, a user can interact with the layer control tool to toggle the states of all non-locked geographic layers in the layer control tool. For instance, a user can interact with a toggle area, such as a corner or title bar, of the layer control tool to change the states of all non-locked geographic layers in the layer control tool from a displayed state to a hidden state.

In this manner, the layer control tool can provide an easily accessible tool for quickly adjusting the display of geographic data layers in a geographic information system with limited required user interaction. This tool can be particularly useful in a mobile device application where display screen space is limited. For example, a user can adjust the display of data layers in conjunction with geographic imagery by interacting with a layer control tool that is displayed overlaying the geographic imagery without having to navigate away from the geographic imagery in the user interface displaying the imagery.

Exemplary User Interface with Layer Control Tool

FIG. 1 depicts an exemplary user interface 100 that includes a layer control tool 200 for managing geographic data layers. The user interface 100 can be provided by a geographic information system that allows a user to navigate geographic imagery, such as the Google Maps™ or Google Earth™ geographic information systems provided by Google Inc. The user interface 100 can be generated for presentation a display 102 of a mobile device 110, such as a smartphone, PDA, tablet, mobile phone, or other device capable of being carried by a user. While the present disclosure will be discussed with reference to a mobile device for purposes of illustration and discussion, the present subject matter is equally applicable to other computing devices capable of displaying imagery.

The user interface 100 presents geographic imagery 104. The geographic imagery 104 can be two or three dimensional imagery of a geographic area of interest. In one example, the geographic imagery can be provided as part of a three dimensional model, such as part of a three dimensional model of the Earth. The user can navigate the geographic imagery 104 by navigating a virtual camera using various control tools or using various other user interactions, such as touch interactions on the display 102. For instance, a user can interact with the user interface to pan, tilt, and zoom the geographic imagery 104.

Various geographic data layers can be presented in conjunction with the geographic imagery 104. The geographic data layers provide information associated with discrete geographic coordinates for display in conjunction with the geographic imagery. Geographic data layers typically present graphical elements in conjunction with the geographic imagery at discrete geographic locations. Exemplary geographic data layers depicted in FIG. 1 include a street information geographic data layer 106 and a three dimensional building geographic data layer 108. The street information geographic data layer 106 can provide information such as the location and names of streets depicted in the geographic imagery 104. The three dimensional building geographic data layer 108 can provide three dimensional renderings of buildings depicted in the geographic imagery 104. Other exemplary geographic data layers can include vegetation layers, geolocated photo layers, a traffic layer, survey data layers, transportation layers, border and label layers, business information layers, and other suitable geographic data layers.

To manage the presentation of geographic data layers in conjunction with the geographic imagery 104, the user interface 100 presents a floating navigation control tool 200 overlaying the imagery. The floating navigation control tool 200 is provided overlaying the geographic imagery 104 such that it is readily accessible by a user. The layer control tool 200 allows a user to quickly control which geographic data layers are presented in conjunction with the geographic imagery 104 so that a user can quickly view and compare geographic data layers in the geographic information system.

The layer control tool 200 can be presented anywhere in the user interface overlaying the geographic imagery 104. A user can manipulate the location of the layer control tool 200 relative to the geographic imagery 104, for instance, by selecting and dragging (e.g. with a finger swipe) the layer control 200 to different locations. In certain implementations, the layer control tool 200 can be hidden off screen. A user can request display of the layer control tool 200, for instance, by interacting with an icon or other graphic associated with the layer control tool 200. A user can hide the layer control tool 200, for instance, by dragging the layer control tool 200 off screen using a touch interaction such as a finger swipe. Other suitable user interactions can be used to display and hide the layer control tool 200 without deviating from the scope of the present disclosure.

Figure 2:
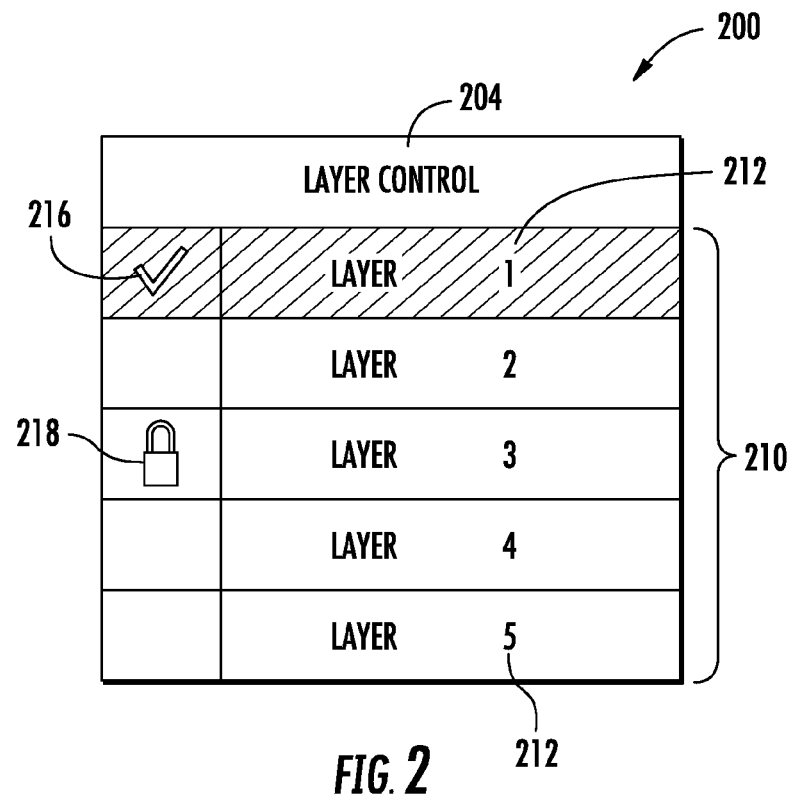
FIG. 2 depicts an exemplary layer control tool according to an exemplary embodiment of the present disclosure.

FIG. 2 depicts an exemplary floating layer control tool 200 according to an exemplary embodiment of the present disclosure. The floating layer control tool 200 provides a layer control interface for a set of geographic data layers 210. The set of geographic data layers 210 can be a subset of a global list of all geographic data layers available in the geographic information system. Moreover, the set of geographic data layers 210 may or may not include all of the geographic data layers that are presented in conjunction with the geographic imagery at any given time. Five geographic data layers are included in the layer control tool 200 of FIG. 2. However, those of ordinary skill in the art, using the disclosures provided herein, will understand that more or fewer geographic data layers can be included in the layer control tool 200 without deviating from the scope of the present disclosure.

The specific geographic data layers included in the set of geographic data layers 210 can be selected by user input. For instance, a user desiring to manage two or more geographic data layers can select the geographic data layers from a global list of all geographic data layers. The selected geographic data layers can then be included in the set of geographic data layers 210 of the layer control tool 200 for quick management of the geographic data layers according to exemplary aspects of the present disclosure. In this way, the layer control tool 200 can provide a customizable tool for geographic data layer management.

The layer control tool 200 includes a title bar 204 and a plurality of layer identifiers 212. Each layer identifier 212 is associated with one of the geographic data layers in the set of geographic data layers 210. The layer identifier 212 can include a short identifier of a specific geographic data layer that is always visible when the layer control tool 200 is displayed. The short identifier can be a text identifier or other suitable graphic.

The layer control tool 200 can further include indicia 216 indicative of whether a geographic data layer is in a displayed state or a hidden state. As will be discussed in detail below, the user interface 100 can display geographic data layers having a displayed state and can hide geographic data layers having a hidden state. The indicia 216 can be any suitable graphic. The indicia can also include a change in color, shading, or background of the layer identifier 212. For instance, in FIG. 1, the background shading of a layer identifier associated Layer 1 is darkened to indicate that Layer 1 is in a displayed state.

The layer control tool 200 can further include indicia 218 indicative of whether a geographic data layer is locked or non-locked. As will be discussed in further detail below, geographic data layers that are locked do not change states between a displayed state and a hidden state in response to user interaction with the layer control tool 200. Similar to indicia 216, the indicia 218 can be any suitable graphic without deviating from the scope of the present disclosure.

The layer control tool 200 allows a user to quickly adjust the display of geographic data layers in the set of geographic data layers 210 using reduced user interaction. For instance, a user can adjust the display of geographic data layers using a single click or tap with the layer control tool 200. In particular, a user can interact with the layer control tool 200 to select a first geographic data layer from the set of geographic data layers 210 by interacting with the layer identifier 212 associated with the first geographic data layer. In response to the user interaction, the geographic information system can display the first geographic data layer in conjunction with the geographic imagery and can hide all of the other displayed geographic data layers in the set of geographic data layers 210.

If a user desires to view a second geographic data layer, the user can interact with the layer control tool 200 to select the second geographic data layer. For instance, the user can interact with the layer identifier 212 associated with the second geographic data layer to select the second geographic data layer. This user interaction will cause the geographic information system to display the second geographic data layer and hide all other geographic data layers in the set of geographic data layers 210, including the first geographic data layer. In this way, the user can very quickly switch between geographic data layers using a single interaction and so that the user can compare the information presented in the geographic data layers without being distracted.

The layer control tool 200 also allows a user to lock or freeze a state of a geographic data layer. For instance, if a user desires to view both the first and second geographic data layers at the same time, the user can provide a user interaction with the layer control tool 200 locking the first geographic data layer in a display state. The user interaction locking the first geographic data layer can be, for instance, a long tap or a double tap. The user can then interact with the layer control tool 200 to select the second geographic data layer for display. Because the first geographic data layer is locked in a display state, the first geographic data layer is not hidden in response to the user selecting the second geographic data layer for display. As a result, the user can view both the first geographic data layer and the second geographic data layer in conjunction with the geographic imagery.

Exemplary Management of Geographic Data Layers Using Layer Control Tool

Figure 3A:
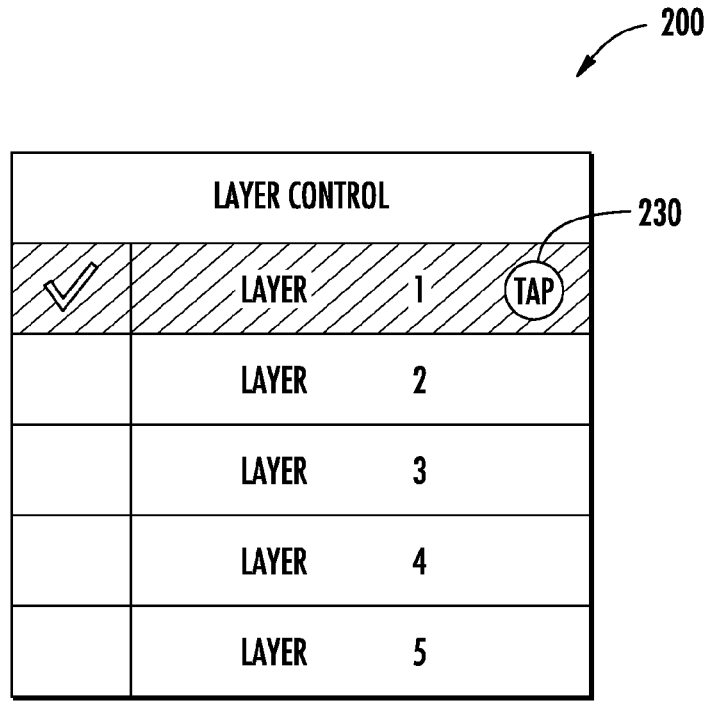
FIGS. 3(A)-3(H) depict the exemplary management of geographic data layers with a layer control tool according to an exemplary embodiment of the present disclosure

To better appreciate the control capabilities of the layer control tool 200 according to exemplary aspects of the present disclosure, the exemplary management of data layers using the layer control tool will be discussed with reference to FIGS. 3(A) to 3(H). Referring to FIG. 3(A), a user provides a user interaction 230 with the layer control tool 200. The user interaction 230 can be a first type of user interaction, such as a click, tap, or short tap. The user interaction 230 can be directed to the layer identifier associated with Data Layer 1. Data Layer 1 can be the street information data layer 106 of FIG. 1. The user interaction 230 can select Data Layer 1 for display in conjunction with the geographic imagery.

Figure 3B:
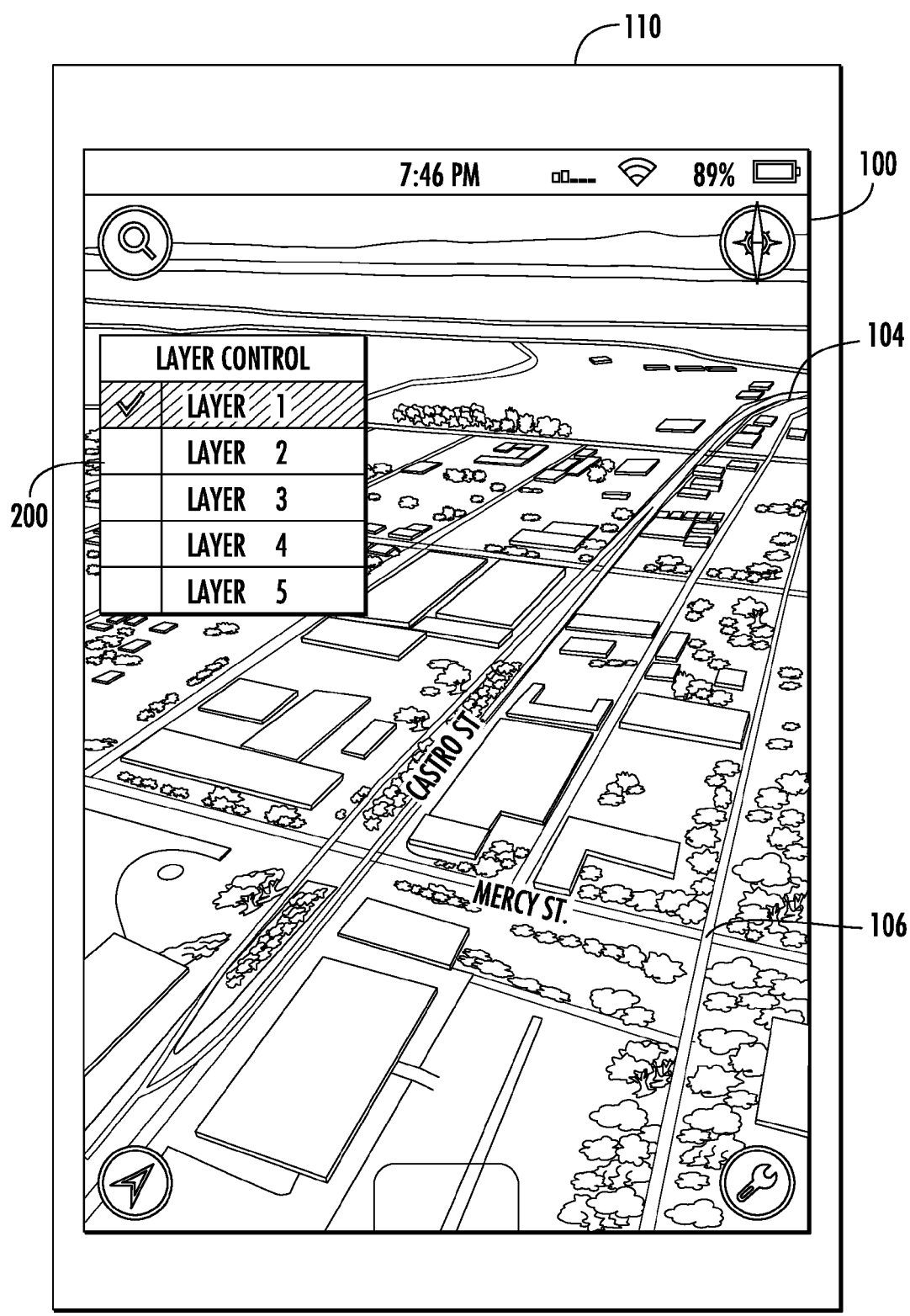

In response to the user interaction 230, the state of Data Layer 1 can be changed to a displayed state. In addition, the state of the remaining geographic data layers in the set of geographic data layers (e.g. Data Layers 2-5) can be changed to or kept in a hidden state. The geographic information system can then display Data Layer 1 and can hide any other displayed geographic data layers in the set of geographic data layers associated with the layer control tool 200. For instance, as shown in FIG. 3(B), Data Layer 1 (e.g. street information data layer 106) is displayed in conjunction with the geographic imagery 104. Other geographic data layers have been hidden (i.e. removed from view), including the three-dimensional building geographic data layer 108 of FIG. 1.

Figure 3C:
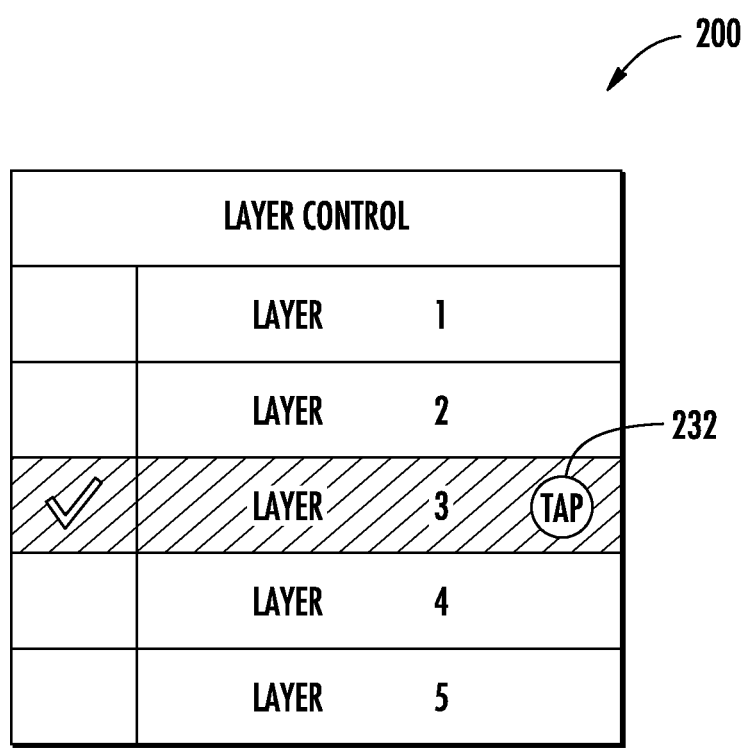
Figure 3D:
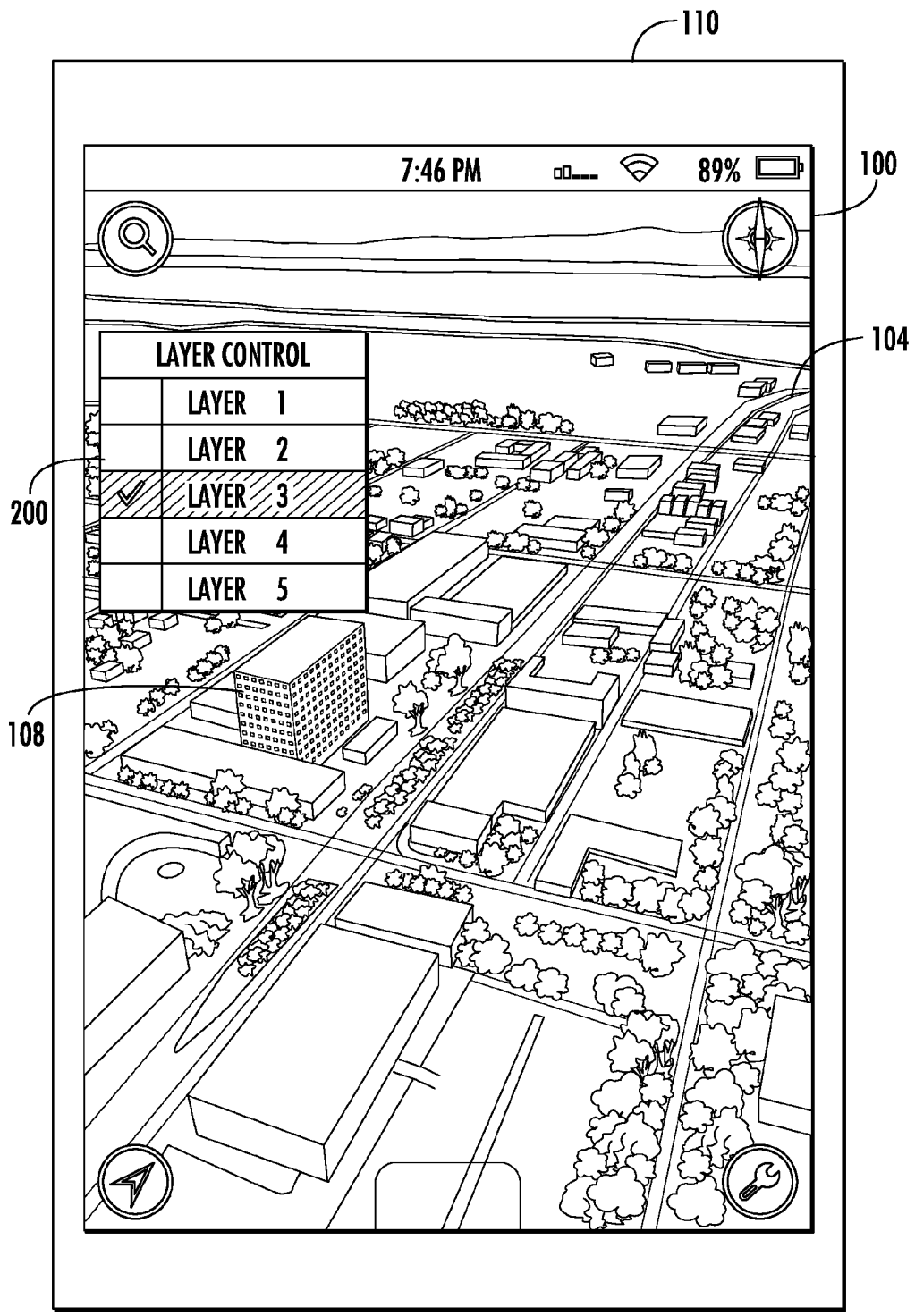

As shown in FIGS. 3(C) and 3(D), a user can switch to a view of a different data layer using a user interaction 232. The user interaction 232 can be a first type of user interaction, such as a click, tap, or short tap. The user interaction 232 can be directed to the layer identifier associated with Data Layer 3. Data Layer 3 can be the three-dimensional building data layer 108 of FIG. 1. The user interaction 232 can select Data Layer 3 for display in conjunction with the geographic imagery.

In response to the user interaction 232, the state of Data Layer 3 can be changed to a displayed state. In addition, the state of the remaining geographic data layers in the set of geographic data layers (e.g. Data Layers 1-2 and 4-5) can be changed to or kept in a hidden state. The geographic information system can then display Data Layer 3 and can hide any other displayed geographic data layers in the set of geographic layers associated with the layer control tool 200. For instance, as shown in FIG. 3(D), Data Layer 3 (e.g. three dimensional building data layer 108) is displayed in conjunction with the geographic imagery 104. Data Layer 1, which was previously displayed, has been hidden. In this manner, the user can easily switch between a view of Data Layer 1 and Data Layer 3 using a single user interaction 232.

Figure 3E:
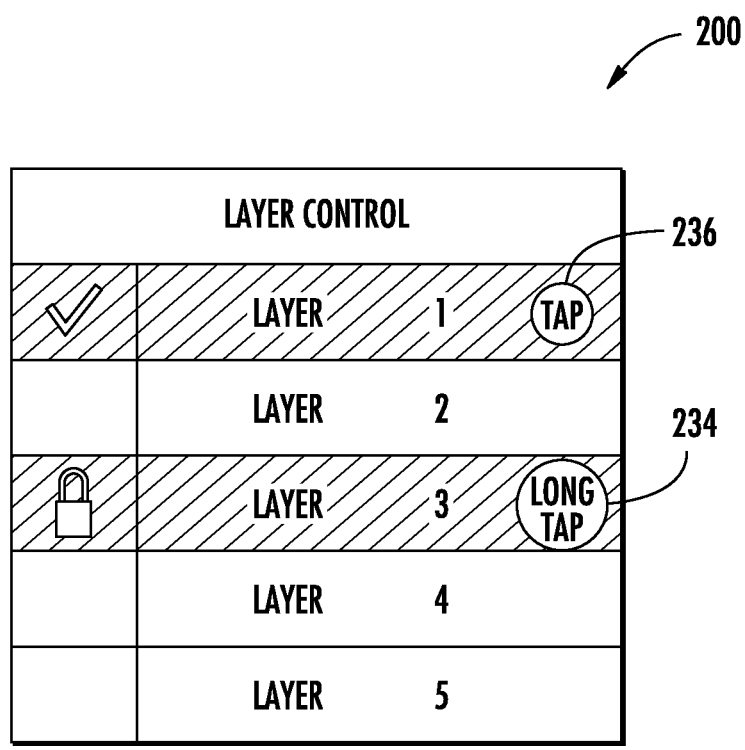

Referring to FIG. 3(E), a user can provide a user interaction 234 locking Data Layer 3 in a displayed state. The user interaction 234 can be a second type of user interaction, such as a double click, a double tap, or a long tap. A subsequent user interaction with the layer control tool 200 will not adjust the display of Data Layer 3 in conjunction with the geographic imagery.

Figure 3F:
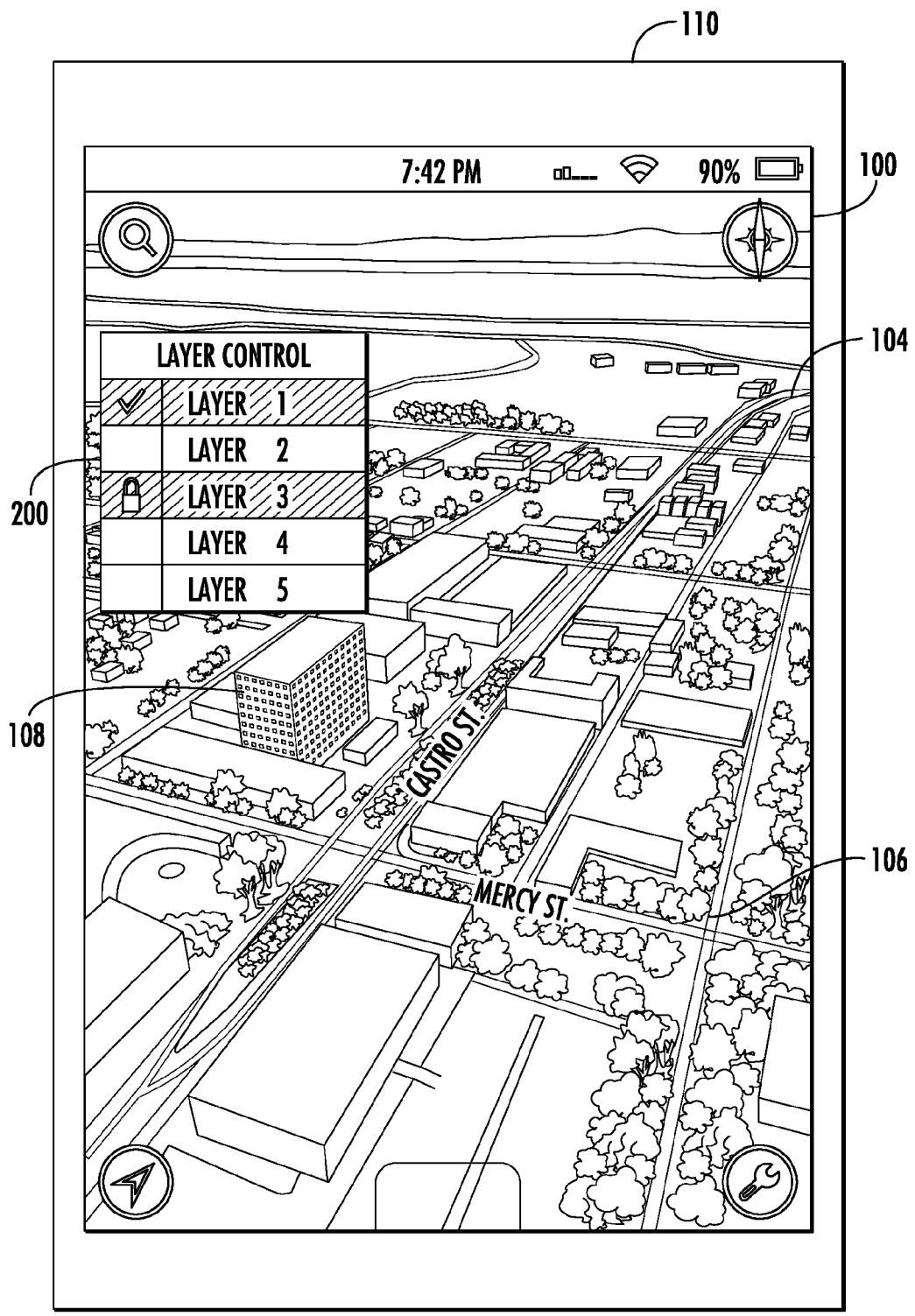

For instance, after locking Data Layer 3, a user can provide a user interaction 236 selecting Data Layer 1 for display in conjunction with the geographic imagery. The user interaction 236 can be a first type of user interaction such as click, tap, or short tap. In response to the user interaction 236, the state of Data Layer 1 can be changed to a displayed state. In addition, the state of the remaining geographic data layers in the set, with the exception of locked Data Layer 3, can be changed to or kept in a hidden state. The geographic information system can then display Data Layer 1 in conjunction with the geographic imagery. For instance, as shown in FIG. 3(F), Data Layer 1 (e.g. street information layer 106) is displayed in conjunction with the geographic imagery 104. In addition, locked Data Layer 3 (e.g. three dimensional building data layer 108) remains displayed in conjunction with the geographic imagery 104.

Figure 3G:
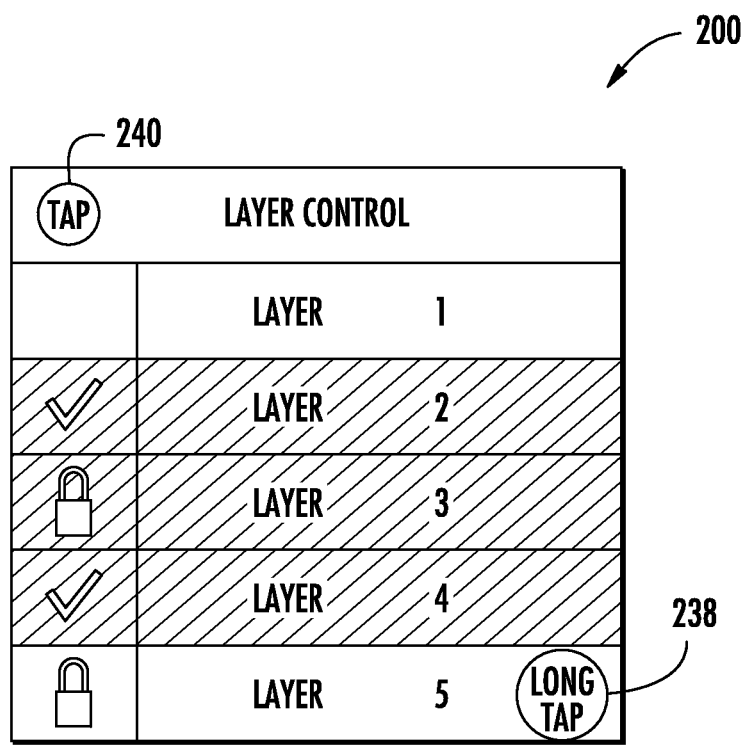

A user can also lock a data layer in a hidden state. For instance, as shown in FIG. 3(G), a user can provide a user interaction 238 locking Data Layer 5 in a hidden state. The user interaction 238 can be a second type of user interaction, such as a double click, a double tap, or a long tap. Because Data Lauer 5 is locked in a hidden state, a subsequent user interaction with the layer control tool 200 will not display Data Layer 5 in conjunction with the geographic imagery.

For instance, a user can toggle the states of non-locked geographic data layers by providing a user interaction 240 to a toggle area of the layer control tool 200. The toggle area of the layer control tool can be the title bar, a corner, or other suitable location of the layer control tool 200. The user interaction 240 can be a first type of user interaction such as a click, tap, or short tap.

In response to the user interaction 240, the state of all geographic data layers in the layer control tool, except locked Data Layer 3 and locked Data Layer 5 can be toggled between a displayed state and a hidden state. For instance, Data Layer 1 can be changed from a displayed state to a hidden state. Data Layer 2 and Data Layer 4 can be changed from a hidden state to a displayed state.

Figure 3H:
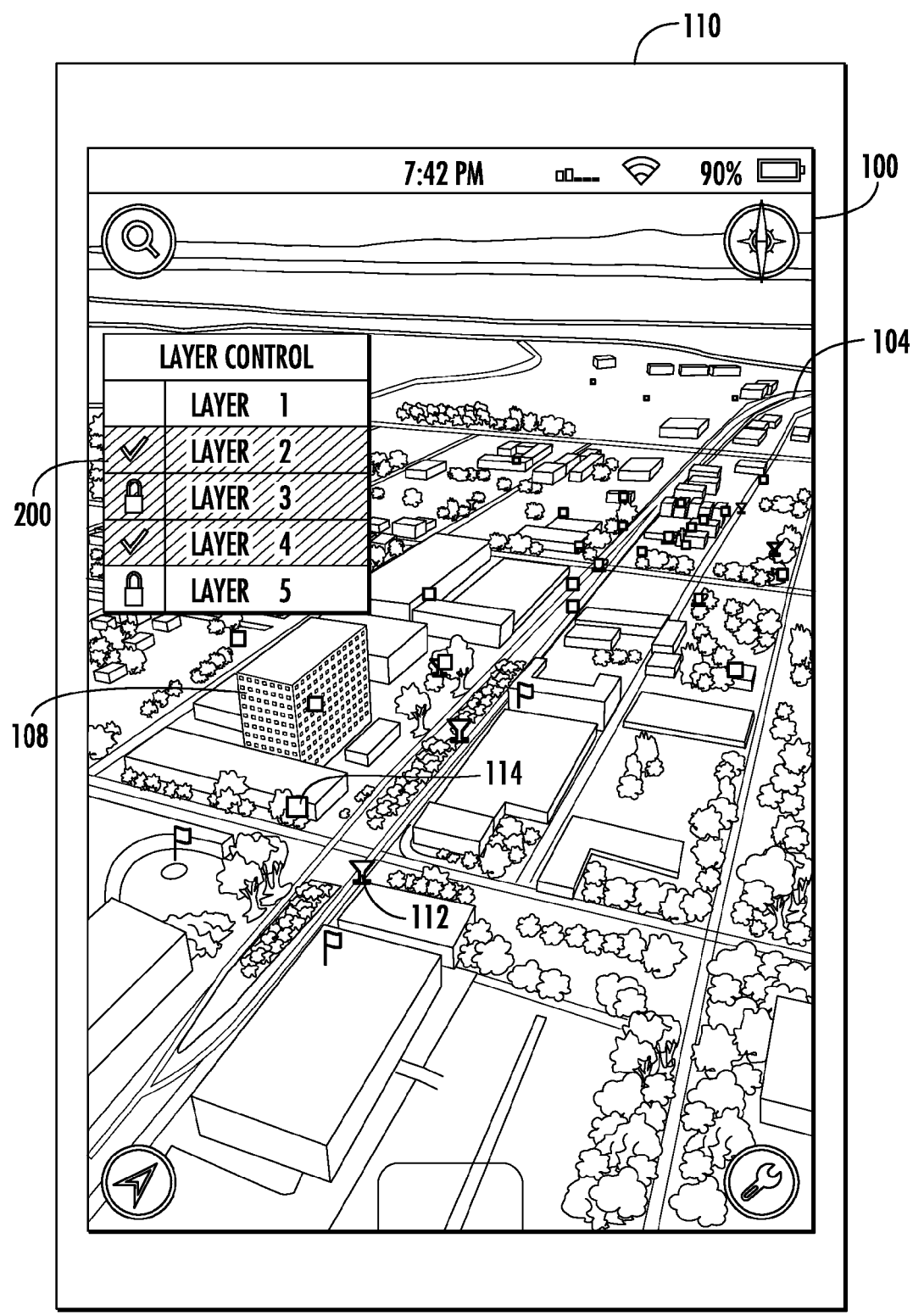

In response to the user interaction 240, the geographic information displays Data Layer 2 and Data Layer 4 and hides Data Layer 1. For instance, as shown in FIG. 3(H), Data Layer 2 (e.g. business information data layer 112), and Data Layer 4 (e.g. geolocated photograph data layer 114) are displayed in conjunction with the geographic imagery 104. Data Layer 1 (e.g. street information data layer 106), which was previously displayed, has been hidden. Data Layer 3 (e.g. three dimensional building data layer 108) remains displayed in conjunction with the geographic imagery 104.

Figure 4:
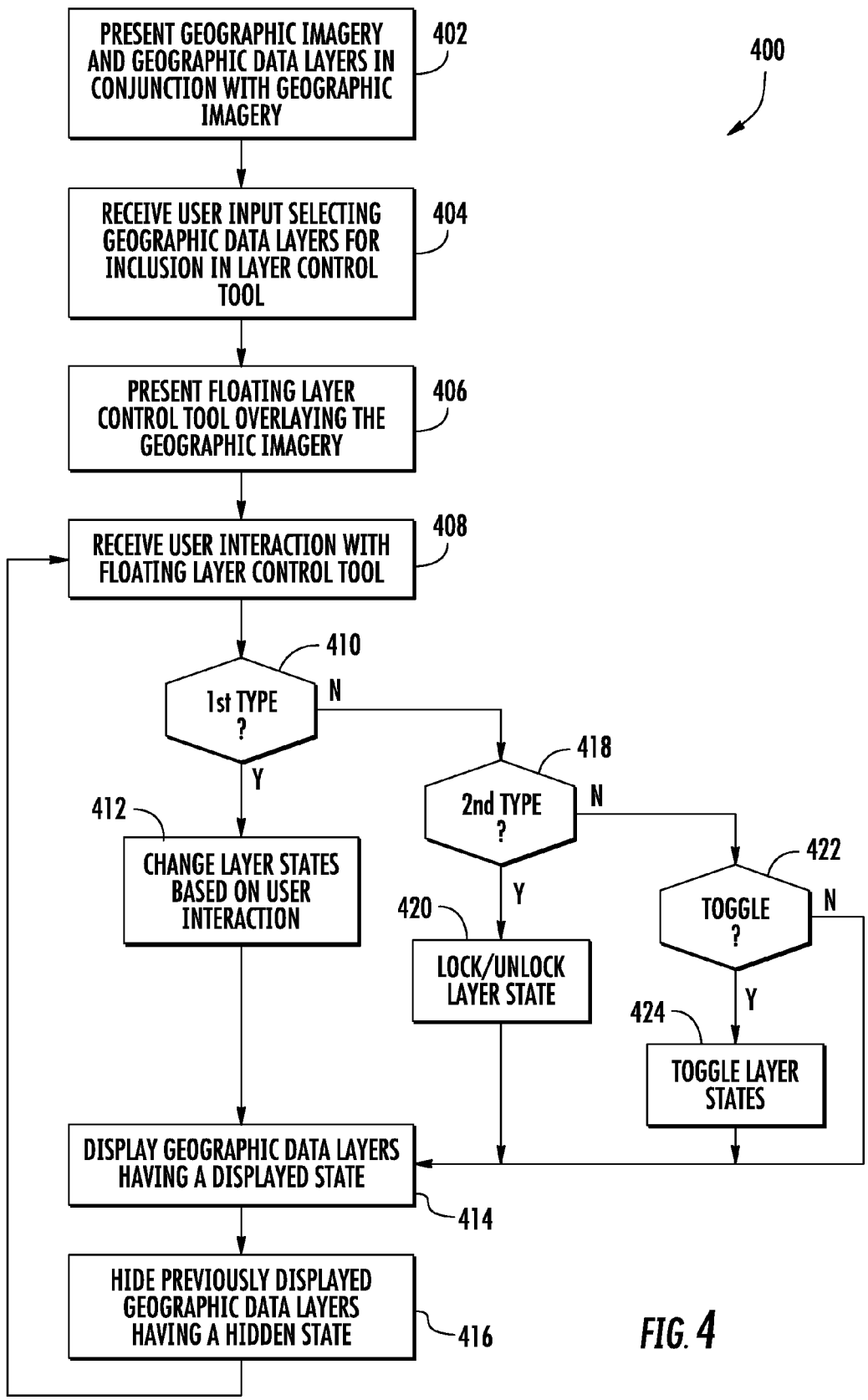
FIG. 4 depicts a flow diagram of an exemplary method according to an exemplary embodiment of the present disclosure.

Exemplary Computer-Implemented Method for Managing Geographic Data Layers Using Layer Control Tool FIG. 4 depicts a flow diagram of an exemplary computer-implemented method (400) for managing geographic data layers in a geographic information using a layer control tool according to an exemplary embodiment of the present disclosure. The method (400) can be implemented using any suitable computing device or system, such as the computing device 510 of FIG. 5. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (402), the method includes presenting geographic imagery and geographic data layers in conjunction with the geographic imagery. For example, the user interface 100 of FIG. 1 can present geographic imagery 104 and geographic data layers 106 and 108. User input selecting geographic data layers for inclusion in a layer control tool is received at (404) of FIG. 4. For instance, a user desiring to manage two or more geographic data layers can select geographic data layers for inclusion in a layer control tool from a global list of all geographic data layers. At (406), a floating layer control tool is presented overlaying the geographic imagery. For example, as shown in FIG. 1, the floating layer control tool 200 is presented overlaying the geographic imagery 104. The floating layer control tool 200 can be presented overlaying the geographic imagery 104 to facilitate access to the floating layer control tool 200.

The floating layer control tool 200 can provide a control interface for a set of geographic data layers 210. The set of geographic data layers 210 can include the geographic data layers selected by the user for inclusion the layer control tool at (404) such that the layer control tool 200 can provide a customizable control interface for quick control of selected geographic data layers.

At (408), the method includes receiving a user interaction with the floating layer control tool. For instance, the method can include receiving a user interaction directed to a layer identifier associated with a specific geographic data layer or to a toggle area of the layer control tool. The user interaction can be received using any suitable input device. For instance, the user interaction can be received via a touch screen provided as part of a mobile device. In response the user interaction at (408), various operations can be performed without further user interaction as set forth below.

If the user interaction received is a first type of user interaction (e.g. a click, tap, short tap) selecting one of the geographic data layers in the set of geographic data layers of the layer control tool (410), the method changes the states of geographic data layers based on the user interaction (412). For instance, the method changes the state of the selected geographic data layer to a displayed state and changes the state of any other non-locked geographic data layers in the set of geographic data layers associated with the layer control tool to a hidden state. The geographic data layers having a displayed state are displayed in conjunction with the geographic imagery (414) while previously displayed geographic data layers having a hidden state are hidden from view (416). The method then returns to (408) where the method waits to receive another user interaction.

If the user interaction is a second type of user interaction (e.g. double click, double tap, long tap) directed to one of the geographic data layers in the layer control tool (418), the method locks or unlocks the geographic data layer responsive to the user interaction (420). In particular, a second type of user interaction directed to a non-locked geographic data layer can lock the geographic data layer. A second type of user interaction directed to a locked geographic data layer can unlock the geographic data layer. Locked geographic data layers do not change states at (412) or at (424) in response to the user interaction at (408). Rather, locked geographic data layers maintain their status in a displayed state or in a hidden state. After locking or unlocking the geographic data layer, the geographic data layers having a displayed state are displayed in conjunction with the geographic imagery (414) while previously displayed geographic data layers having a hidden state are hidden from view (416). The method then returns to (408) where the method waits to receive another user interaction.

If the user interaction is a toggle interaction directed to a toggle area of the layer control tool (422), the layer states of all non-locked geographic data layers are toggled between a displayed state and a hidden state (424). In particular, all non-locked geographic data layers having a displayed state are toggled to a hidden state. All locked geographic data layers having a hidden state are toggled to a displayed state. Geographic data layers having a displayed state are then displayed in conjunction with the geographic imagery (414) while previously displayed geographic data layers having a hidden state are hidden from view (416). The method then returns to (408) where the method waits to receive another user interaction.

Exemplary Computer-Based System for Implementing the Layer Control Tool

Figure 5:
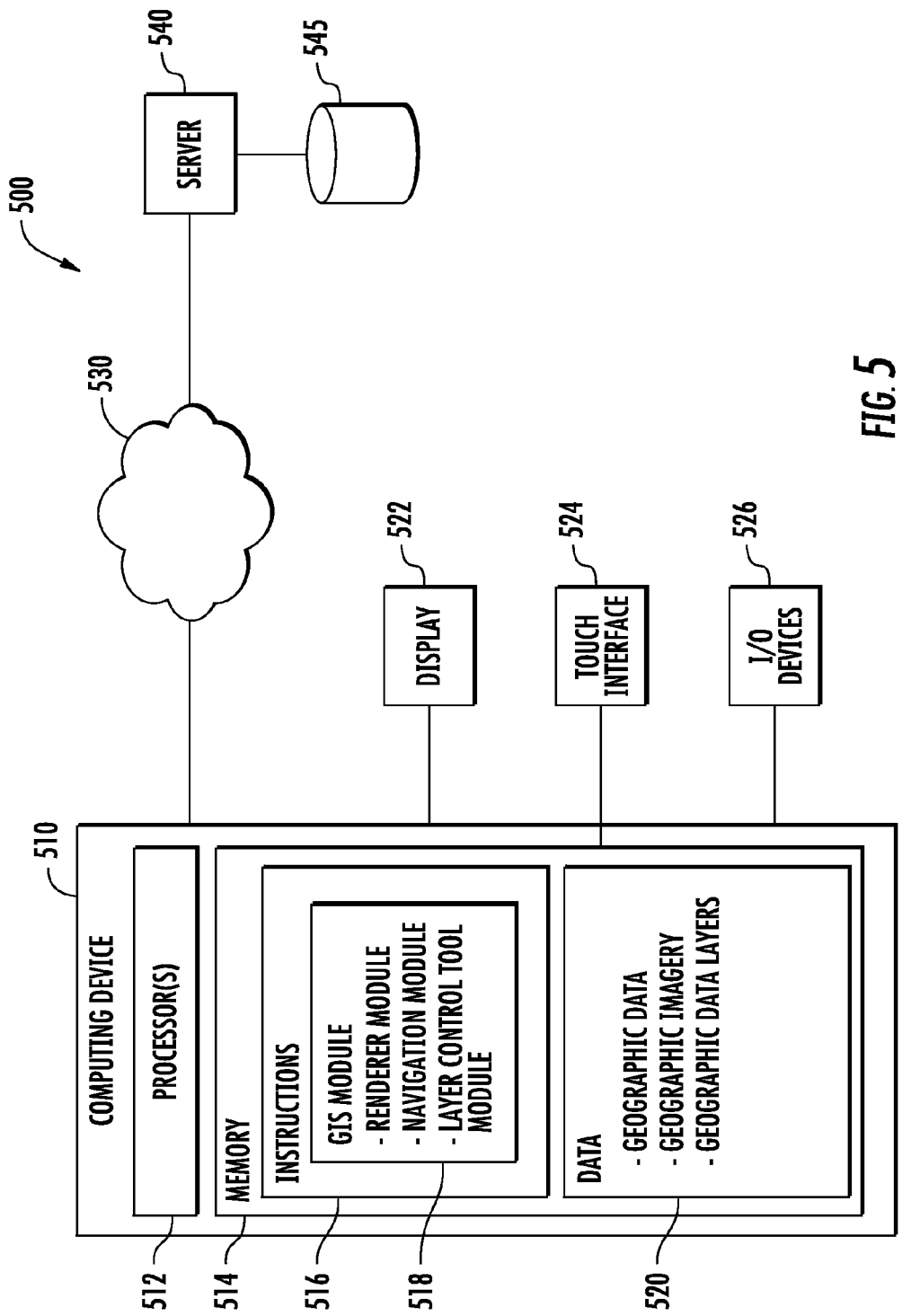
FIG. 5 depicts an exemplary system according to an exemplary embodiment of the present disclosure.

FIG. 5 depicts an exemplary computing system 500 that can be used to implement the layer control tool for geographic data layer management in a geographic information system according to exemplary aspects of the present disclosure. The system 500 includes a computing device 510. The computing device 510 can be any machine capable of performing calculations automatically. For instance, the computing device can include a general purpose computer, special purpose computer, laptop, desktop, integrated circuit, or other suitable computing device. In a particular implementation, the computing device 510 can be a mobile device, such as smartphone, tablet, cell phone, or other mobile device capable of being carried by a user. The layer control tool can be particularly suitable for mobile devices as the layer control tool can provide the ability to quickly control geographic data layers using limited display space.

The computing device 510 can have a processor(s) 512 and a memory 514. The computing device 510 can also include a network interface used to communicate with remote computing devices over a network 530. In one exemplary implementation, the computing device 510 can be in communication with a server 540, such as a web server, used to host a geographic information system, such as the Google Maps™ and/or the Google Earth™ geographic information systems provided by Google Inc.

The processor(s) 512 can be any suitable processing device, such as a microprocessor. The memory 514 can include any suitable non-transitory computer-readable medium or media, including, but not limited to, RAM, ROM, hard drives, flash drives, magnetic or optical media, or other memory devices. The memory 514 can store information accessible by processor(s) 512, including instructions 516 that can be executed by processor(s) 512. The instructions 516 can be any set of instructions that when executed by the processor(s) 512, cause the processor(s) 512 to provide desired functionality. For instance, the instructions 516 can be executed by the processor(s) 512 to implement a geographic information system (GIS) module 518. The GIS module 518 can allow a user of the computing device 510 to interact with a geographic information system hosted by, for instance, the server 540.

The GIS module 518 can include, among other components, a renderer module, a navigation module, and a layer control tool module. The navigation module can receive user input regarding a desired view in the geographic information system and uses the user input to construct a view specification for a virtual camera. The renderer module uses the view specification to determine what data to draw and draws the data. If the renderer module needs to draw data that the computing device 510 does not have, the renderer module can send a request to the server 540 for the data over the network 530. The layer control tool module can be used to implement the layer control tool for controlling geographic data layers according to aspects of the present disclosure.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media. For instance, the GIS module, including the renderer module, navigation module, and layer control tool module can be implemented using HTML, XML, Java, Flash, or other suitable platform.

Memory 514 can also include data 518 that can be retrieved, manipulated, created, or stored by processor(s) 512. For instance, memory 514 can store geographic data, geographic imagery, geographic data layers, and other information that is used by the GIS module. Processor(s) 512 can use this data to present geographic information including geographic imagery and one or more geographic data layers to a user.

Computing device 510 can include or can be coupled to one or more input/output devices. Input devices may correspond to one or more peripheral devices configured to allow a user to interact with the computing device 510. One exemplary input device can be a touch interface 524 (e.g. a touch screen or touchpad) that allows a user to interact with the geographic information system using touch commands, such as taps, double taps, short taps, long taps, and other touch commands. Output device can correspond to a device used to provide information to a user. One exemplary output device includes a display 522 for presenting the user interface, including the floating layer control tool, to allow a user to interact with the geographic information system. The computing device 510 can include or be coupled to other input/output devices 526, such as a keyboard, microphone, mouse, audio system, printer, and/or other suitable input/output devices.

The server 540 can host the geographic information system. The server 540 can be configured to exchange data with the computing device 510 over the network 530. For instance, responsive to a request for information, the server 540 can encode data in one or more data files and provide the data files to the computing device 510 over the network 530. Similar to the computing device 510, the server 540 can include a processor(s) and a memory. The server 540 can also include or be in communication with one or more databases 545. Database(s) 545 can be connected to the server 540 by a high bandwidth LAN or WAN, or can also be connected to server 540 through network 530. The database 545 can be split up so that it is located in multiple locales.

The network 530 can be any type of communications network, such as a local area network (e.g. intranet), wide area network (e.g. Internet), or some combination thereof. The network 530 can also include a direct connection between a computing device 510 and the server 540. In general, communication between the server 540 and a computing device 510 can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing geographic data layer control in a geographic information system, the method comprising:
   presenting, by one or more computing devices, a user interface on a display of a computing device with a touch interface, the user interface displaying at least a portion of geographic imagery and a plurality of geographic data layers in conjunction with the geographic imagery;
   presenting, by one or more computing devices, a floating layer control tool overlaying the geographic imagery, the floating layer control tool providing a control interface for a set of geographic data layers;
   receiving, by one or more computing devices, a first touch interaction of a first type directed to the floating layer control tool placing a first geographic data layer in a locked state, the first geographic data layer being displayed in conjunction with the geographic imagery;
   receiving, by the one or more computing devices, a second touch interaction of a second type directed to the floating layer control tool selecting a geographic data layer in the set of geographic data layers as a selected geographic data layer, the first touch interaction of the first type being a different type of touch interaction relative to the second touch interaction of the second type; and
   in response to the second touch interaction and without further user interaction, performing operations comprising:
      displaying, by the one or more computing devices, the selected geographic data layer in conjunction with the geographic imagery; and
      hiding one or more of the set of geographic data layers that are displayed in conjunction with the geographic imagery;
   wherein the geographic data layer in the locked state is not hidden in response to the second touch interaction.

2. The computer-implemented method of claim 1, wherein each of the plurality of geographic data layers provides information associated with discrete geographic coordinates.

3. The computer-implemented method of claim 1, wherein the method comprises receiving a user input selecting a geographic data layer for inclusion in the set of geographic data layers.

4. The computer-implemented method of claim 1, wherein the floating layer control tool comprises a plurality of layer identifiers, each layer identifier associated with a geographic data layer in the set of geographic data layers.

5. The computer-implemented method of claim 4, wherein the second touch interaction selecting a geographic data layer in the set of geographic data layers is directed to one of the plurality of layer identifiers.

6. The computer-implemented method of claim 1, wherein the first touch interaction of the first type of user interaction is a long tap and the second touch interaction of the second type of user interaction is a-short tap.

7. The computer-implemented method of claim 1, wherein the first touch interaction of the first type is a double tap and the second touch interaction of the second type of user interaction is a single tap.

8. The computer-implemented method of claim 1, wherein the layer control tool comprises at least one toggle area, the method comprises:
   receiving a user interaction directed to the at least one toggle area; and
   in response to the user interaction directed to the at least one toggle area, toggling a state of each geographic data layer in the set of geographic data layers between a displayed state and a hidden state.

9. The computer-implemented method of claim 8, wherein the toggle area is a corner or a title bar of the layer control tool.

* * * * *